Sept. 29, 1970  C. O. MERCHANT  3,531,618
AUTOMATIC WELDING MACHINE
Filed Aug. 19, 1966  3 Sheets-Sheet 1
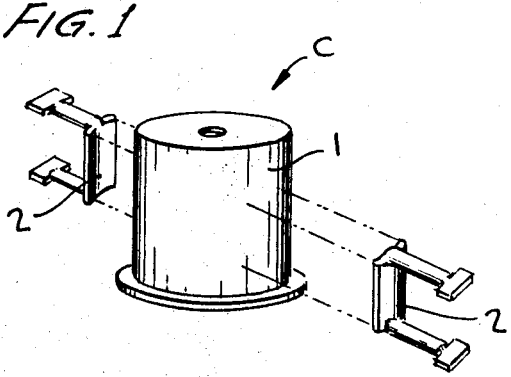
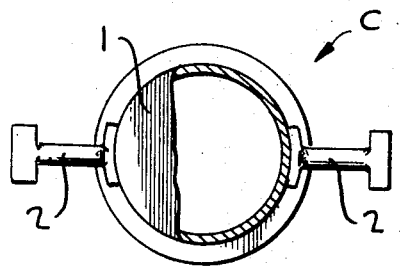
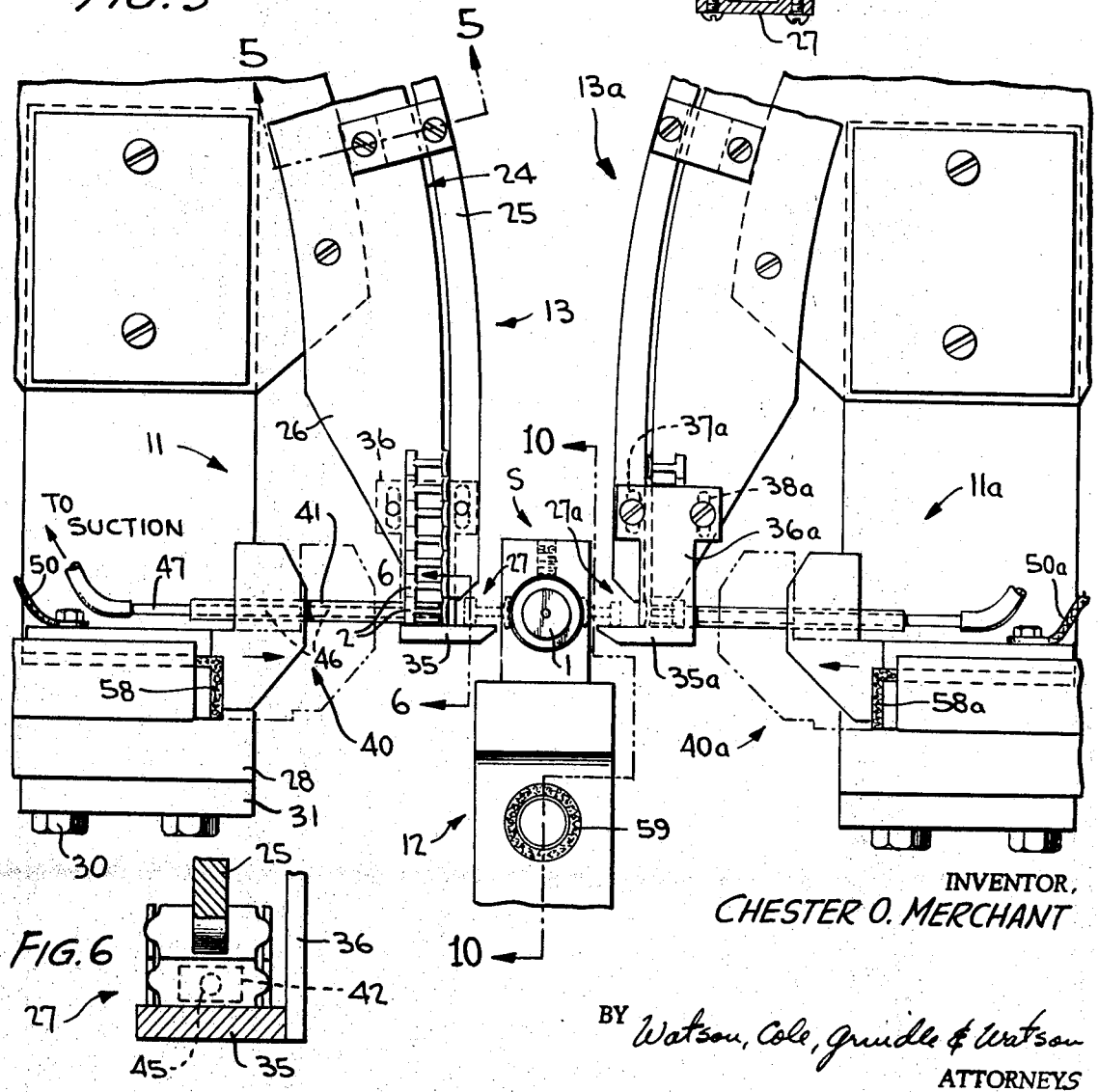
INVENTOR,
CHESTER O. MERCHANT
BY Watson, Cole, Grindle & Watson
ATTORNEYS

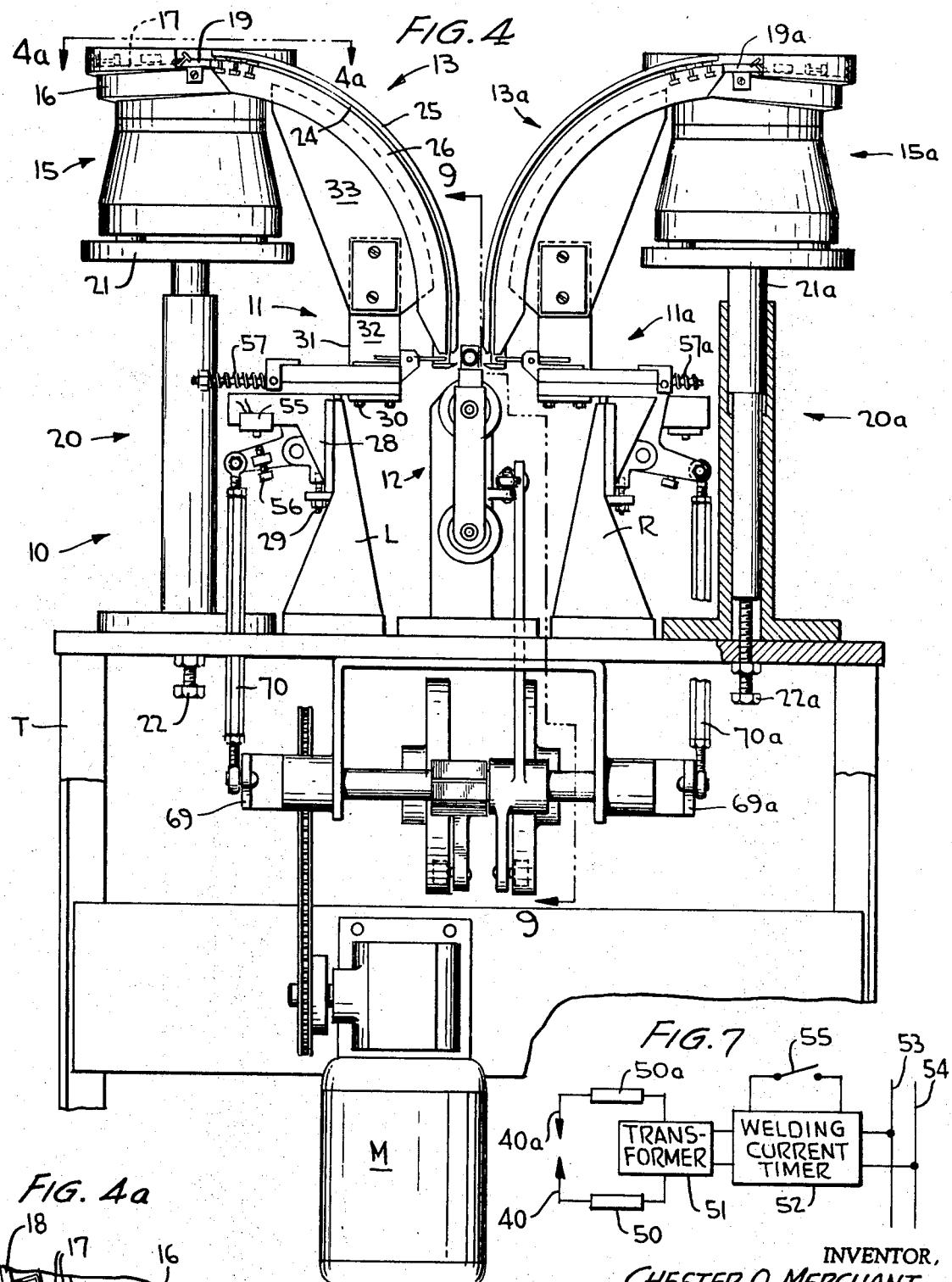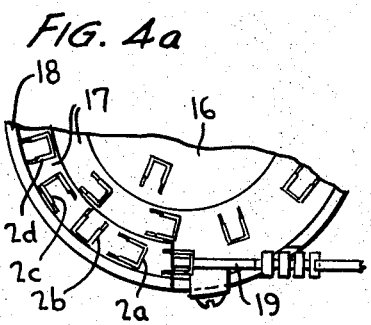

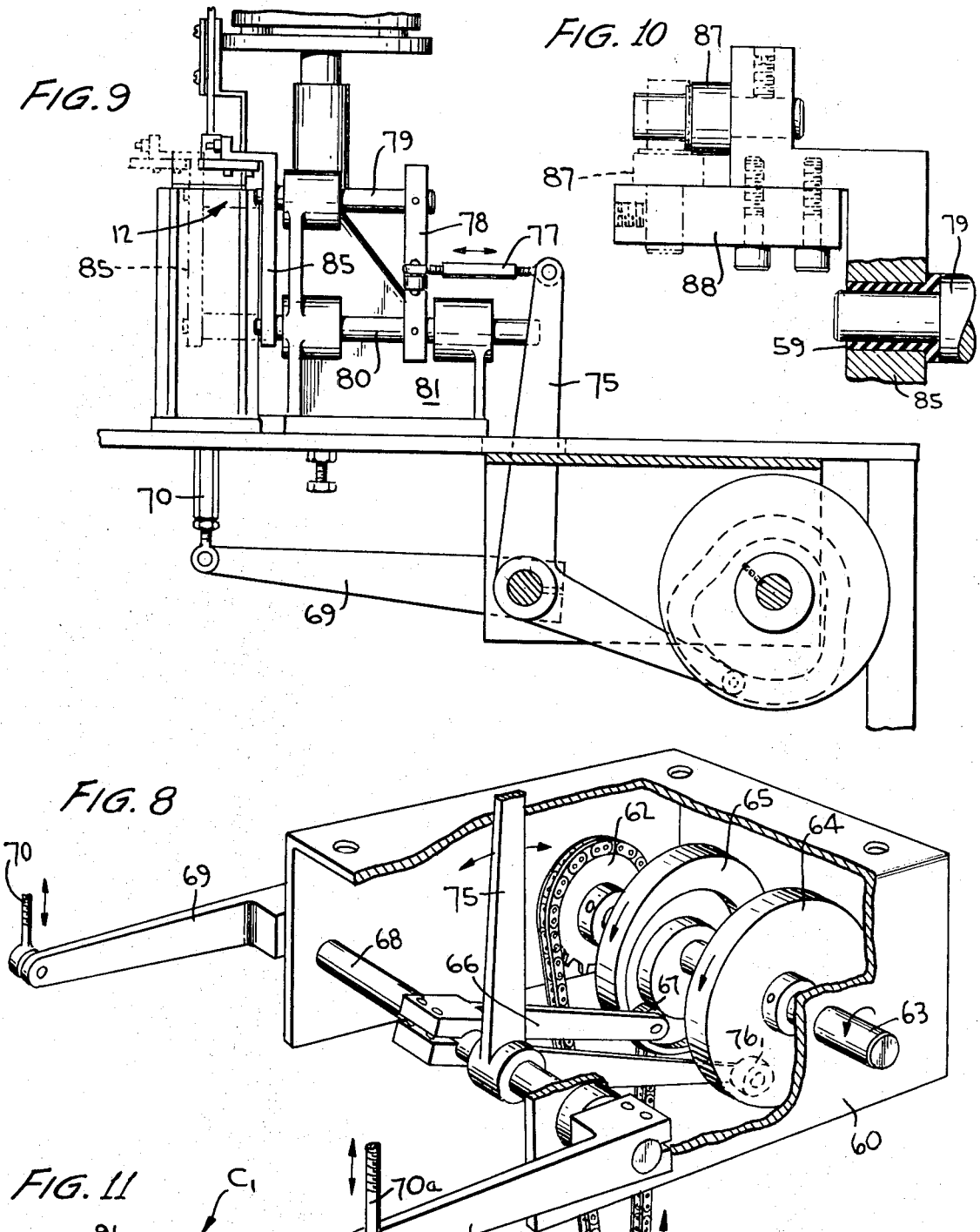

United States Patent Office 3,531,618
Patented Sept. 29, 1970

3,531,618
AUTOMATIC WELDING MACHINE
Chester O. Merchant, Owensboro, Ky., assignor to Kentucky Electronics Inc., Owensboro, Ky., a corporation of Kentucky
Filed Aug. 19, 1966, Ser. No. 573,524
Int. Cl. B23k 9/02, 11/02, 11/04
U.S. Cl. 219—103
9 Claims

ABSTRACT OF THE DISCLOSURE

An improved automatic machine is provided for welding mounting brackets to cylindrical electrodes of a cathode ray tube in precise positions. Generally U-shaped brackets with a curvature conforming to the cylindrical electrode are fed into and along a special track confining them for sequential positioning by a movable welding member into final exact position against the surface of the cylindrical electrode.

The present invention relates to specialty welding apparatus and processes and, more particularly, to an apparatus and process for automatically welding electron tube components, such as electrode components for electron guns in cathode ray tubes, especially cathode ray tubes for black and white television sets and special communication equipment.

It is conventional in the art of manufacture of electron guns for black and white television tubes to mount a plurality of prefabricated metal electrode bodies each having a pair of metal supporting straps or members in opposed thermoplastic beads to form the electron gun of the tube. These thermoplastic beads serve to position the electrode bodies both in the longitudinal and the transverse direction and when this positioning function is performed accurately, the completed gun produces a discrete beam of electrons that can be properly directed to the screen of the television tube for reproduction of the image being received by the television set.

Many machines and processes have been proposed in which these electrode components can be mass-produced in an automatic or semi-automatic fashion, such as is illustrated by the patent to Pityo No. 2,846,561 issued on Aug. 5, 1958. While the machines of the prior art have generally served their purpose in the past, with the advent of television tubes having a shortened axial length and tubes with smaller screens for use in personal size portables and other special communication equipment such as video telephones and visual electronic computer readout systems, the need for higher quality controls in these electrode components has become more and more evident since the wider diversion of the electron beam during operation in shorter tubes and the closer pattern of the luminescent dots on the screen of a smaller tube tends to magnify any discrepancy present in the electron beam. The need for this higher quality has been found to extend not only to the accuracy in forming the component parts that go to make up the electrode component, but also to extend to the need for higher quality welds that hold the parts together.

Further, due mainly to the advent of the portable sets and the development of the specialized communication equipment such as the above mentioned video-telephones, television tubes are now being made in an increasing number of sizes, many of which require a different size and type of electron gun. Thus, in the present day television industry, tube manufacturers may have to fabricate as many as ten or fifteen different electron guns and prior to the present invention there has been no machine available that is easily adapted to quick change-over from a set up to produce one electron gun component to another set up to produce another type or size of component. This results from the fact that each prior art machine of which I am aware incorporates the particular transport mechanism and expensive forming dies for the U-shaped straps that is adaptable for only one size or type of gun which, in turn, means that the machines are too expensive for wide spread use in the field. Obviously, it would be highly desirable to provide a machine that is adaptable to handle the many different size and type parts to suit the increasing special needs of tube manufacturers and to avoid the outmoding of a machine each time a tube is discontinued, and as will be seen later, this adaptability is one of the outstanding features of the machine of the present invention.

One of the best general modes or methods of forming an electrode component has proven to be the general arrangement shown by the aforementioned Pityo patent wherein the U-shaped studs are simultaneously delivered to opposite sides of the electrode body by the advancement of opposed welding heads or electrodes toward said electrode body for the welding operation. Thus, in these machines the positioning of the stud or the U-shaped member against the electrode body is performed solely by the welding electrode so that an efficient welding operation can be carried out.

In these prior art arrangements, however, the formation of the U-shaped members from an endless piece of wire has been an operation that is carried out by the welding machine itself just prior to the welding operation. To do this, the U-shaped members necessarily need to be engaged by forming dies and other positioners as they approach the electrode body so that the welding machines have heretofore been very expensive and unadaptable to economical placement in large numbers in the field, as indicated above. Further, unless these prior machines are kept under close surveillance and adjustment by the operator, when the dies begin to wear there is a tendency toward misalignment or skewing of the U-shaped members during the approach of the welding head which tends to not only produce an inexact supporting U-shaped member in the die, but also tends to reduce the quality of the weld between the parts. These inaccuracies and uneven, weak welds have been found to be a major cause in lessening the quality of the finished components, which in turn causes the undesirable reduction in quality of the picture of the television set. Furthermore, these shortcomings of the prior art are likely to cause complete failure of the parts during assembly or later during the normal expected service life of the tube which, of course, is also undesirable from the standpoint of quality of the product.

To overcome the foregoing inefficiencies connected with the formation of electron tube components, tube manufacturers have recently been turning to the purchase of preformed parts and then fabricating the parts into electrode components as they are needed. With this arrangement the parts may be more accurately formed by a tube parts specialist and further the tube manufacturer need not make an expensive outlay of capital for the precision dies required in the prior art machines. With this innovation in the electron gun art, it has thus become desirable to have a machine that can be placed in the hands of the tube manufacturers at a reasonably low cost, and at the same time be able to weld electron tube components with greater accuracy than has heretofore been possible.

Thus, it is one object of the present invention to provide welding apparatus for economically and accurately fabricating electron gun components.

It is another object of the present invention to provide a welding machine of the type described that performs the function of welding together preformed parts to form an electrode tube component.

It is still another object of the present invention to provide a relatively inexpensive welding machine that is adaptable to handle a wide variety of different shapes and sizes of electrode tube component parts to meet the needs of tube manufacturers with only a small outlay of money for capital equipment.

It is a further object of the present invention to provide a welding machine for electrode tube components that requires no heavy and expensive dies and thus that can operate on low power, with increased speed and with little or no chance of jamming the operative parts of the machine that perform the welding function.

Another object of the present invention is to provide welding apparatus having a welding head that automatically positions preformed U-shaped studs on the electrode body for attachment to the same during the welding operation.

Another object of the present invention is to provide apparatus of the type described for mass production of electron gun components for black and white television sets and special communication equipment wherein the finished components are of a high quality.

It is an additional object of the present invention to provide apparatus for welding electron components wherein the parts are relatively small so as to be generally incapable of efficient handling by hand.

It is still another object of the present invention to provide an apparatus of the character described that can be placed in the manufacturing field for operation by unskilled operators, requires a minimum amount of maintenance, and has a long service life.

One preferred embodiment of the apparatus and process of the invention comprises a support track that delivers the U-shaped members in succession to a transfer station, a welding electrode or welding head adapted for movement across said station to pick up the U-shaped members and a mandrel for mounting the electrode body in a position to receive the members as the electrode is moved to the welding station. The transfer station of the apparatus and process is characterized by a novel landing table which is positioned adjacent the terminal end of the track and carries the U-shaped members in succession for accurately positioning each of the U-shaped members prior to the welding operation. One important feature of the invention is concerned with the placement of this table at a distance from the end of the track that is slightly greater than the height of the U-shaped member whereby the welding electrode serves to form a gate for the remaining U-shaped members along the track when the welding electrode is displaced from the ready or withdrawn position.

To provide for easy and better access to the mandrel that positions the electrode body and the finished component, the mandrel of the invention is preferably mounted on a reciprocating base which is operable to sequentially move between the welding station within the machine and the loading and unloading station that is free from the confines of the machine. This feature allows for increased production since the operator can more easily load and unload the machine and also contributes significantly to the safety of the operator since the welding heads are incapable of operation during the loading and unloading operations.

Another aspect of the invention relates to the novel manner in which the U-shaped member is attached to the operative face of the welding electrode as the same is moved from the ready position to the welding position during the operation of the machine. In the machine of this invention, this is accomplished by providing a suction area within the confines of the operative face of the welding head to generate a pressure differential so that the U-shaped member is successfully attached to said operative face and carried across the gap between the mandrel and the landing table during the welding stroke. This form of pneumatic holding device has been found to be especially adapted for use with the small parts that are required in the electron guns for small tubes and such pneumatic means serves as the sole means for holding and aligning the U-shaped member for accurate positioning at the welding station.

Another important feature of the invention is concerned with the construction of the downwardly extending transport track for the preformed stud members as they are fed to the transfer station for pick up by the welding electode. This conveyor takes the form of a relatively flat plate having an exposed edge along which the U-shaped studs are adapted to slide as said studs ride in a straddling position along the track. To complete the track an opposed plate confines the bight of the studs so that once they are placed on the track they can not be dislodged until they reach teh transfer station.

Preferably the conveying and welder assembly just described is duplicated on the other side of the mandrel in accordance with this invention so that the forces on opposite sides of the electrode body during the formation of the electron gun component are neutralized and so that a complete component is formed during each machine cycle. It has been found that this arrangement is particularly adapted for either the conventional type of U-shaped stud that extends radially outward from the electrode body, as shown in FIGS. 1 and 2 of the drawings, or, in the alternative, for the new transversely extending U-shaped stud member that has its legs extending in a non-radial fashion, as shown in FIG. 11 and which may be used in the electron gun disclosed and claimed in United States Pat. No. 3,239,708, issued Mar. 8, 1966, to Jay H. Johnston and assigned to the present assignee. Further, it is contemplated that the apparatus of the invention is easily adaptable for use with other types and sizes of stud members or parts, i.e. the machine with minor modification could be used to feed and weld for example L-shaped stud mounting members or leads for the electronic connections to the electrode body.

Accordingly, it is another and more specific object of the present invention to provide welding apparatus wherein preformed parts are delivered along a downwardly extending track by gravity to a transfer station and are then moved by the welding head to the welding station in an efficient manner.

It is another object of the invention to provide a machine of the type described wherein the welding head performs a gating function at a transfer station so as to properly feed stud members in sequence for welding to an electrode body at a welding station.

It is still a further object of the present invention to provide a machine for welding electrode components in which the centrally located mandrel for supporting the electrode body between the U-shaped members is mounted for movement into and out of the confines of the machine for ease of loading and unloading of the parts.

It is still a further object of the present invention to provide a machine having welding heads that operate to carry the U-shaped members to the welding station by pneumatic suction means that opens into the operative face of the welding head thus insuring that the mounting studs are properly held and positioned.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

In the accompanying drawings which form a part of the disclosure of the present invention and in which like numerals are employed to designate like parts, FIG. 1 is an exploded perspective view of one type of electron tube component that can be welded with the machine of the present invention;

FIG. 2 is a top view of the completed component of FIG. 1, partially broken away;

FIG. 3 is a front view of a machine constructed in accordance with the invention showing the primary operating stations involved in the welding operation;

FIG. 4 is an over-all front view of the machine of FIG. 3 showing the complete operating mechanism;

FIG. 4a is a view taken along line 4a—4a of FIG. 4;

FIG. 5 is a cross-sectional view taken along line 5—5 of FIG. 3 showing the position that the U-shaped mounting members take on the transport track;

FIG. 6 is a cross-sectional view taken along line 6—6 of FIG. 3 showing the welding head pick-up of the U-shaped mounting members;

FIG. 7 is a diagrammatic illustration of a welding circuit suitable for use with the present invention;

FIG. 8 is a side perspective view with parts broken away for clarity showing the operating mechanism for the opposed welders of the machine of the invention;

FIG. 9 is a sectional view showing the operating mechanism for the electrode body supporting mandrel taken along line 9—9 of FIG. 4;

FIG. 10 is a detailed sectional view taken along line 10—10 of FIG. 3 illustrating the mounting of the supporting mandrel in alternative positions; and FIG. 11 is an exploded view of an alternative type of electrode component that can be welded with the machine of the present invention.

Referring now to FIGS. 1 and 2 of the drawings, there is shown one type of electron tube component which is designed for use in a cathode ray tube which is capable of being welded by using the teachings of the present invention. This showing of a particular electron tube component is for purposes of illustration only and as indicated, the machine and process of the present invention can be utilized to fabricate other types of similar electron tube components or sub-assemblies.

With this in mind, it is pointed out that the electrode component of FIGS. 1 and 2 of the drawings, generally represented by the reference indicia C, comprises a tubular electrode body 1 and preformed studs or mounting members 2 welded on opposite sides of the tubular body 1. It will be realized by those skilled in the art that this particular product is the conventional electrode component C wherein the studs 2 are described as extending radially outward from the electrode body 1; said component C being adapted to be positioned between two opposed thermoplastic mounting members in combination with other like components to form a completed electron gun (not shown in any of the drawings).

The body 1 and the mounting studs 2 are preferably fabricated from a suitable non-magnetic material, such as No. 305 Stainless Steel which includes 12% nickel and 18% chrome alloyed with ferrous metal. The walls of the tubular body 1 are of a thickness within a range of about 0.005 to 0.010 inch and the stud 2 is usually from 0.015 to 0.025 inch thick in the flattened areas; this combination of thicknesses having been found to give the particular combination with the material recited for combining the electrons into a shaped beam and for strength and rigidity of the electron gun assembly, as more fully discussed in my copending application, Ser. No. 523,714, filed Jan. 28, 1966, and entitled "Automatic Welding Machine." As best shown in FIG. 2, the outer surface of the flattened bight of the stud 2 is or may be formed so as to substantially conform to the contour of the body 1 to provide a strong welded bond between the mating parts.

With reference now in particular to FIG. 3 and FIG. 4 of the drawings, there is shown a welding machine 10 that is constructed in accordance with the teachings of the present invention and comprises a first welding unit 11 and a second welding unit 11a, which are positioned in opposed relationship to each other on a table T by separate tower supports L and R (FIG. 4). As will be evident from viewing these figures, the welding units 11, 11a are identical and designed to operate on the opposite sides of the electrode body 1, which is adapted to be held at a welding station S on an upstanding support assembly, generally represented by the reference numeral 12. The support assembly 12 is preferably positioned along the center line of the machine 10 and forms a central location where the electrode body 1 and the opposed mounting studs 2 are brought together to form the complete electrode component C; the opposed mounting studs 2 being delivered to the welding units 11, 11a along opposite sides of the machine 10 by opposed conveyor units 13, 13a, respectively. Since the welding units 11, 11a and the corresponding conveyor units 13, 13a are identical in structure as mentioned above, it is deemed to be necessary to discuss only one of each of the units in detail below; it being understood during the discussion that like parts are identified by the same reference numerals with the suffix "a" being added to the reference numerals to identify the unit and parts thereof physically positioned on the right-hand side of the machine 10 as viewed in FIGS. 3 and 4.

However, before proceeding with the detailed description of the welders 11, 11a and the conveyors 13, 13a, attention is directed to FIGS. 4 and 4a wherein is disclosed a means for storing the studs 2 and initially presenting the same to the conveyors 13, 13a which consists of vibratory feed hoppers 15, 15a into which a supply of the U-shaped studs are placed prior to initiating operation of the machine 10. The vibratory parts feeders 15, 15a are of a conventional construction and may be commercial units known in the art as the "Peeco Parts Feeder."

As illustrated in FIGS. 4 and 4a, the upper bowl portion 16 of the vibratory parts feeder 15 has an upwardly extending spiral ramp 17 extending around the outer periphery of the bowl 16. Oscillatory vibrating motion is transferred to the bowl 16 by a conventional motor and spring combination mounted in the base of the feeder 15 and due to the upward and forward thrust transferred to the studs 2 by said vibratory motion, the studs 2 are caused to walk or proceed up the spiral path afforded by the peripheral ramp 17, as well illustrated in FIG. 4a. As is conventional in vibratory parts feeders of this type, the combination of the spiral ramp 17 and the vibratory motion causes the studs 2 to be snugly engaged with an outer wall 18 of the bowl 16 so that as the parts 2 approach the terminal end of the ramp 17, they are properly positioned to be engaged by the vertical transfer plate 19 fixed to the bowl 16 for vibration therewith and having its upper edge substantially in the plane of said terminal end.

As can be seen from viewing FIG. 4a in particular, there are four possible orientations of the U-shaped studs 2 as the terminal end of the ramp 17 is reached as indicated by reference numerals 2a–2d. If the U-shaped studs 2 are orientated as represented by the reference numerals 2a and 2c, then said studs 2 will fall astraddle of the transfer plate 19 whereupon they are fed forward by the same vibratory motion for delivery to the downwardly extending conveyor 13 (note FIG. 4). If, on the other hand, the U-shaped studs 2 are positioned as shown by the positions 2b, 2d in FIG. 4a, these will merely fall to the lower portion of the ramp 17 to be redelivered to the terminal portion of said ramp 17 for delivery. As can be seen, this arrangement can be designed to insure that the desired number of the studs 2 are delivered to the conveyor unit 13 to cause an accumulation of the studs 2 along the entire length of the unit for continuous operation of the machine 10. Furthermore, once the studs 2 have fallen astraddle of the transfer plate 19 they are assured of being in proper orientation for delivery to the conveyor unit 13.

For the purpose of properly positioning the parts feeders 15, 15a above the table T so as to align the terminal end of the transfer plates 19, 19a with the entrances to the respective conveyor units 13, 13a, there are provided pedestals 20, 20a having adjustable stands 21, 21a, respectively, which are operable for the purpose indicated by means of adjustment screws 22, 22a threadedly engaging the top of the table T and working against said stands 21, 21a, respectively (see cross-sectional view of the pedestal 20a in FIG 4). When the proper adjustment has been made and the separate feeders 15, 15a have been activated, the feeding of the U-shaped studs 2 into the conveyors 13, 13a is automatically accomplished without further attention by the operator of the machine 10.

Turning now to the description of the conveyor unit 13, as can best be seen in FIGS. 3 and 4, a downwardly extending transport track 24 is formed by opposed operative guide edges of transport plates 25, 26 that are equally spaced by connecting straps 27 (FIG. 5) along the entire length of said track 24. In operation, the members 2 are transferred from the transfer plate 19 to the lower transport plate 26 in the same straddling position since said transfer plate 19 has previously been aligned with said transport plate 26 by the adjustable pedestal 20 described above. The bight portion of the studs 2 is advantageously held captive between said operative edges forming said track 24 as illustrated in FIG. 5, so that once the studs 2 have been positioned in the track 24 by the transfer plate 19 they are incapable of being dislodged therefrom. As is now evident, the studs 2 are continuously fed in abutted relationship along the track 24 by gravity for ultimate positioning at a transfer station depicted by the reference numeral 27 at the terminal end of said track 24 to supply said studs to the welder unit 11 for the welding operation.

The welder units 11, 11a are constructed so as to be identical for the most part to the welder construction disclosed and claimed in my aforementioned copending application, so that a complete description here is deemed to be unnecessary. Basically, the welder unit 11 comprises a main T-shaped mounting block 28 that is mounted for vertical sliding adjustment by the tower support L; an adjusting jackscrew 29 being supplied to perform this function. Affixed to the underside of the horizontal portion of the mounting block 28 by fastening means 30 is an L-shaped bracket 31 having an upwardly extending leg 32 which carries a support plate 33 for the conveyor unit 13.

It will be remembered that the transfer station 27 in accordance with the present invention, is the point at the terminal end of the track 24 where the studs 2 are delivered just prior to the welding operation. In the apparatus of the present invention, this station is determined by a novel landing table 35 that is suspended from the ends of the transport plates 25, 26 by an integral bracket portion 36. As will be clear from observing FIG. 3, the landing table 35 is adapted to receive each of the U-shaped members in succession for positioning the same opposite to the electrode body 1 for the welding operation. The bracket portion 36 is preferably connected to the plates 25, 26 by a pair of fasteners 37 through a corresponding pair of slotted holes 38 so that the distance between the terminal end of the plates 25, 26 and the table 35 can be easily adjusted for the proper height of the U-shaped stud 2 being used. In operation, the landing table 35 is adjusted substantially as shown in FIG. 6 so that the distance between the terimnal end of the track 24 and the landing table 35 is slightly greater than the height of the stud 2 whereby the plate 25 functions to restrain the movement of all of the studs 2 except that stud positioned at the transfer station 27 during the welding operation, now to be described.

The welder unit 11 further comprises a horizontally reciprocable welding head 40 that includes a replaceable welding electrode 41, said welding head 40 being movable between a withdrawn or ready position represented by the full lines in FIG. 3, and the welding position represented by the dashed line outline in this figure. In the withdrawn position, an operative or forward face 42 (FIG. 6) of the welding head 40 is located behind the bight portion of the stacked U-shaped members 2 whereupon the first of said studs 2 in line has dropped by gravity onto the landing table 35 (note FIGS. 3 and 6).

At this point it should be noted that the operative face 42 of the welding head 40 has been previously axially aligned with the predetermined position on the electrode body 1 that is to receive the stud 2 by adjustment of the jackscrew 29 so that as said forward face 42 is moved forward along said table 35, the stud 2 is picked up and accurately carried to said predetermined position. Incidentally, it is noted that during this adjustment, the conveyor 13 and the landing table are desirably maintained in the preset relationship with respect to the welding head 40 since, as will be remembered, both of these elements are bodily carried by the welding unit 11 through the L-shaped bracket 31.

As shown in FIG. 3, the welding electrode 41 and the operative face 42 thereof are substantially the same height as the studs 2 so that when the welding head 40 is displaced from the withdrawn position, the same acts as a gate to retain the subsequent members in said transport track 24; i.e. the bight portion of the next stud 2 is slidably engaged by the welding head 40 and not released until the welding operation has been performed and the welding head 40 is returned to the withdrawn position in readiness for the next cycle.

There is provided a gap between the landing table 35 and the support assembly 12 that carried the electrode body 1 for welding so that the support assembly 12 can be moved transversely to said table 35 after the welding operation for ease of loading and unloading of the parts in a manner to be described later. For the purpose of causing the U-shaped stud 2 to span this gap just prior to the welding operation as it is carried forward by the operative face 42 of the welding head 40, there is provided in accordance with the invention, a suitable orifice 45, as shown in FIG. 6, which orifice 45 is connected to a longitudinally extending channel 46 in the welding head 40. The channel 46 is connected at its remote end to a suitable suction means 47 so that air is constantly being drawn into said orifice 45 whereby a pressure differential is set up across the bight portion of the U-shaped member 2 that is to be welded, thereby causing the member 2 to be frictionally attached to said operative face 42 of said welding head 40. Thus, it can be seen that a simple means is provided whereby the U-shaped stud 2 can be made to rapidly negotiate the gap between the table 35 and the electrode body 1 without the use of holding jigs or dies of the prior art and furthermore it has been found that the use of suction in this manner insures that the stud 2 is accurately placed against the side of the electrode body 1 for welding in each instance. Also, it will be realized that since the path of travel of the studs 2 from the transfer station 27 to the welding station S is unobstructed, a minimum amount of driving power is required and the possibility of jamming of parts is minimized.

To accomplish the actual welding operation at the welding station when the dotted line position of the mounting members 2 in FIG. 3 is reached, there is provided a welding circuit as shown in FIG. 7 which is designed to pass the necessary welding current through the component C at the welding station S. For the purpose of interconnecting the circuit to the mounting heads 40, 40a, there are provided electrical conductors 50, 50a, respectively, as shown in FIG. 3. These conductors 50, 50a are in turn connected through a suitable welding transformer 51 and a welding current timer 52 to a pair of supply lines 53, 54 as shown in the circuit diagram of FIG. 7. Suitably connected to operate the welding timer 52 is a microswitch 55 that is adapted to be actuated by an adjustable bolt 56

(note FIG. 4) which is carried by a movable part of the actuating mechanism for the welder 11. Thus, in operation, as the welding heads 40, 40a reach the welding station S and the studs 2 are brought under pressurized contact by the springs 57, 57a of the welders 11, 11a so as to be rigidly clamped to opposite sides of the electrode body 1, the end of the bolt 56 will close the microswitch 55 thus initiating the cycle of the welding current timer 52 to thereby deliver the welding current to cause resistance heating of the parts for welding. Of course, suitable insulators 58, 58a and 59 are provided for the welding heads 40, 40a and for the support assembly 12, respectively, so that the full charge of electrical current is available for welding of the parts.

It is noted that the forward movement of the welding heads 40, 40a into the welding position is designed so that each of said heads 40, 40a stops short of the electrode body 1 if for some reason a stud 2 is not properly fed into place at the transfer station 27, 27a. Thus, no welding operation takes place under these circumstances since the welding circuit is not completed so that there is no chance of incomplete welds being formed when using the apparatus of this invention.

Also, since the welding heads 40, 40a are advanced and reach the welding station S simultaneously through driving linkage that will presently be described and the welding circuit is not actuated unless the parts are in position and under the required pressurized contact as just noted, there is insured an operation whereby there is no chance of arcing between the parts to be welded. Furthermore, the weld obtained is uniform in each instance due to the accurate timing by the welding timer 52 during each cycle, which timer 52 can, of course, be adjusted to suit the particular parts being welded.

According to the invention and as best viewed in FIG. 4, the driving power for both the reciprocating welders 11, 11a and the reciprocating support assembly 12 is provided by a single motor M that is mounted on the lower portion of the table T that supports the machine 10 of the present invention. The driving linkage to interconnect the motor M with said welders 11, 11a and said support assembly 12 is compactly mounted under the top of the table T by a U-shaped frame 60. For the purpose of operatively connecting the working parts to the motor M, a chain 61 (note FIGS. 4 and 8) is provided to drive a sprocket 62 which is drivingly mounted on the drive shaft 63 (FIG. 8) through which a pair of closed cams 64, 65 are driven. The cam 65 causes a lever 66 to be oscillated by engagement with the follower roller 67 that is carried by said lever 66. This oscillating motion is transferred to the shaft 68 which in turn causes the operating levers 69, 69a to be moved in an up and down direction, as shown in FIGS. 4 and 8. This vertical reciprocating motion in turn is translated to a pair of adjustable pitmans 70, 70a, respectively, which impart the necessary reciprocating motion to the welders 11, 11a, through the springs 57, 57a, respectively, as more specifically pointed out in my aforementioned U.S. patent application Ser. No. 523,714.

Concurrently with the operation of the welders 11, 11a by the mechanism just described, the closed cam wheel 64 is operative to actuate the bell crank lever 75 through the follower roller 76; the lever 75 being journaled for rotation on the shaft 68 so that the operation of said bell crank 75 is independent of the movement of said shaft 68. As shown in FIG. 9, the remote free end of the bell crank 75 is connected to an adjustable horizontal drive pitman 77 which in turn is operative to transfer a reciprocating motion to a yoke 78 that interconnects a pair of horizontal plungers 79, 80 which slide in a plurality of journals suitably formed and positioned in the mounting tower 81. The forward ends of the plungers 79, 80 are rigidly connected to the support assembly 12 that includes Z-shaped carrier 85 and supporting mandrel 87 for the electrode body 1, as can best be seen in FIG. 10 of the drawings.

As will be evident from viewing FIG. 3 in particular, the mandrel 87 supports the electrode body 1 in a horizontal position to receive the mounting studs 2 in substantially a radial relationship whereby an electrode component is fabricated that is in accordance with the conventional teachings in the art as exemplified by the Pityo patent mentioned above. During each cycle just after the welding operation, as can be noted from viewing FIG. 9, the mandrel 87 is projected outwardly by the shifting linkage described above to the dotted line position outside the confines of the machine so that the loading and unloading operations can be performed with ease by the operator. Also, it will be noted that the cams 64, 65 are driven by the same shaft 63 so that the sequence of operation of the machine can be designed so that the outward shifting of the mandrel 87 takes place at precisely the time that the welding heads 40, 40a just clear the studs 2 during the withdrawal stroke, which fact further enhances the speed of the machine for increased efficiency.

It will be remembered that one of the features of this invention is that the machine may be easily adapted to perform the welding operation on alternative forms of electron tube components. Thus, with reference to FIG. 11 there has been illustrated one such alternative arrangement that consists of an electrode component $C_1$ for a cathode ray tube wherein the electrode body 1 is supplied with transversely extending U-shaped straps or members 91, as described in the aforementioned U.S. Pat. to Johnston No. 3,239,708. The only physical change that must be made in the machine other than adjustment of the operating parts is illustrated in FIG. 10, wherein the mandrel 87 has been relocated to assume a vertical position by an adapter 88, as depicted by the dotted line outline. In other words, since the electrode body 1 is now held in the vertical position, if the U-shaped straps 91 are fed horizontally to said electrode body 1 in precisely the same manner as before, the completed component $C_1$ with transverse straps 91 is obtained.

Thus, it will be realized that a welding machine 10 and related process has been provided that is efficient in operation and which employs simplified means and steps for delivering parts such as the U-shaped studs 2 or straps 91 to the welding position S. Also, the machine is capable of a rapid operation so that production can be significantly increased over the prior machines and is completely automatic in its sequencing and operation.

Further, and perhaps more importantly, the machine is easily adaptable through simple adjustments for use with various types of electron tube components, only two of which have been illustrated herein, and the machine, being of simple construction and adapted for low maintenance requirements, can be relatively inexpensively provided in significant numbers for use in the field by tube manufacturers.

While the machine 10 has been disclosed in conjunction with no specific automatic loading and unloading structure for the electrode body 1 and for the completed component C, $C_1$, it should be understood that automatic loading and unloading of these parts is particularly suited to this system due to the fact that the support assembly 12 reciprocates to the dotted line position of FIG. 9 so as to make these parts easily accessible during each cycle of operation. Further, it is realized that while electric resistance welder units 11, 11a are presently preferred, any other type of welder, including the recently developed ultrasonic and laser beam welders, could be used in conjunction with certain aspects of the present invention.

In this disclosure, there is shown and described only the preferred embodiment of the invention, but as aforementioned, it is to be understood that the invention is capable of various changes or modifications within the scope of the inventive concept as expressed by the accompanying claims.

I claim:
1. In an automatic welding machine for welding electron tube components, each of said components including a cylindrical electrode body and a protruding bracket member to be welded to the outer surface of said body, the improvement of a conveying and welder assembly comprising a transport track for feeding a plurality of said members of specified height along said track in sequence to a transfer station, a landing table at said transfer station for positioning each of said members in turn in alignment with said cylindrical body in readiness for the welding operation, a mandrel mounted at a welding station in spaced relationship to said table to position said electrode body to receive in proper alignment said bracket member to be welded thereto, a welding head mounted in axial alignment with the member to be welded and adapted for movement across said table between a ready position at said transfer station and a welding position at said welding station, said welding head being substantially the same height as said members so that said welding head acts to displace one member and to retain the subsequent members in said track from reaching said landing table while said welding head is displaced from said ready position, said welding head having an operative face at the forward end thereof, and gripping means carried by said welding head for attaching the member to be welded to said operative face of said welding head as it moves from said ready position and for retaining the member through movement into contact with said cylindrical surface until the member and electrode body are welded together whereby said members are delivered across the gap between said table and said mandrel for welding to said body upon movement of said welding head to said welding station.

2. The combination of claim 1 wherein said members are substantially U-shaped and wherein said track includes a pair of substantially coplanar separated plates having operative guide edges in opposed relationship to each other, said U-shaped members being adapted to be slidably positioned on one of said plates with the bight portion of said member extending across the operative edge of said one plate and the other of said plates serving to retain said members in said slidable position.

3. The combination of claim 2 wherein said track is curved through substantially 90°, said track extending substantially horizontally at the beginning and substantially vertically at the terminal end as the transfer station is approached, whereby the weight of a predetermined number of said members is effective to urge the member at said transfer station by gravity into position on said table when said welding electrode is in said ready position.

4. The combination of claim 1 wherein is provided a reciprocable carriage for said mandrel which is movable substantially horizontally between a loading and unloading station and said welding station, said movement serving to displace said mandrel outside the confines of said machine to facilitate loading and unloading of said components and to align said electrode body with the member positioned at the respective stations, and common driving means for the carriage and the welding head moving the carriage in synchronism with said movement of the welding head.

5. The combination of claim 1 wherein said gripping means includes an orifice formed in said operative face of said welding head and suction means connected to said orifice for generating a pressure differential across the member to be welded.

6. In an automatic welding machine for welding electron tube components, each of said components including a main body comprising a cylindrical shell and a relatively small member comprising a bracket to extend from said shell to be welded to said body, the improvement of a conveying and welder assembly comprising a transport track for feeding a plurality of said bracket members in sequence to a transfer station at an open terminal end of said track serving to discharge said members, a landing table at said transfer station for positioning each of said members in turn in readiness for the welding operation, said landing table being positioned a distance from said terminal end of said track that is slightly greater than the height of said members, support means mounted at a welding station in spaced relationship to said table to position said main body with respect to the member to be welded thereto, welding means mounted in alignment with the member to be welded on said landing table and adapted for transporting said member by movement across said table from a ready position near said transfer station to a welding position at said welding station, said welding means being substantially the same height as said members so that said welding means acts as a gate to retain the subsequent members in said track while said welding means is displaced from said ready position, said welding means having an operative face at the forward end thereof, gripping means carried by said welding means for attaching the member to be welded to said operative face of said welding means, and means actuating said gripping means during transport from said landing table to a welding position adjacent the surface of said cylindrical shell whereby said members are delivered across the gap between said table and said support means for welding to said body upon movement of said welding means to said welding station.

7. The combination of claim 6 wherein said gripping means includes an orifice formed in said operative face of said welding means and suction means connected to said orifice for generating a pressure differential across the member to be welded.

8. The combination of claim 7 wherein is further provided a vibratory conveyor at the beginning of said transport track to effect placement of said plurality of said members on said track, and wherein said transport track extends downwardly from said vibratory conveyor so as to feed said members by gravity, said landing table being suspended from said terminal end of said track.

9. In an automatic welding machine for welding electron tube components, each of said components including a main body comprising a hollow cylindrical shell and a pair of preformed bracket members to be welded to opposite sides of said body and extend therefrom for mounting said bracket members having a curved surface conforming with the outer surface of said shell, the improvement of a conveying and welder assembly comprising a centrally located mandrel for positioning said main body at a welding station, means for moving said mandrel between a welding station and a loading and unloading station, a pair of downwardly extending transport tracks on opposite sides of said welding station for feeding a plurality of said members in sequence by gravity to a pair of transfer stations for discharge at the terminal ends of said tracks, a pair of landing tables at said transfer stations for positioning each of said members in turn in opposed relationship to said welding station in readiness for the welding operation, said landing tables being located from the respective terminal ends of said tracks and spaced therefrom a distance slightly greater than the height of said members, said landing tables being mounted in spaced relationship to said mandrel on opposite sides thereof, a pair of welding heads mounted in axial alignment with the members to be welded and adapted for movement by the means moving said mandrel along a common axis across the respective tables from a ready position at the respective transfer stations to a welding position at said welding station, said welding heads each having an operative face at the forward end thereof, gripping means carried by said welding heads for holding the members to be welded against said operative face of the respective welding heads whereby said members are delivered across the gap between said tables and said mandrel and are urged against said body with the curved surfaces serving to mate the members for welding to said main body, and timing means connected to said means for moving said mandrel and to said welding heads whereby said mandrel is positioned at said welding station when said welding heads are moved simultaneously along said axis to the welding position to urge the members against the body, said timing means operating to weld the opposed bracket members to said body while they are held in contact therewith by said welding heads.

References Cited
UNITED STATES PATENTS

| | | | |
|---|---|---|---|
| 1,898,468 | 2/1933 | Tapman | 219—150.5 |
| 2,846,561 | 8/1958 | Pityo | 219—79 |
| 2,905,803 | 9/1959 | Brady | 219—79 |
| 3,011,046 | 11/1961 | Erskine | 219—107 |
| 3,161,753 | 12/1964 | Schmick | 219—79 |
| 3,271,555 | 9/1966 | Hirshon et al. | 219—85 |
| 3,288,976 | 11/1966 | Sandret | 219—56 |
| 3,299,248 | 1/1967 | Meyer | 219—98 |
| 3,309,495 | 3/1967 | Shoup et al. | 219—98 |
| 3,317,770 | 5/1967 | Merchant | 219—93 |

WILLIAM D. BROOKS, Primary Examiner

U.S. Cl. X.R.

219—101